United States Patent
Ladocsi et al.

(10) Patent No.: US 10,146,246 B2
(45) Date of Patent: Dec. 4, 2018

(54) ROTOR FOR VEHICLE PEDAL WITH CONTACTING SENSOR

(71) Applicant: CTS Corporation, Lisle, IL (US)

(72) Inventors: Nicholas L. Ladocsi, Midlothian, VA (US); Murray Kaijala, Elkhart, IN (US); William S. Stewart, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 15/681,770

(22) Filed: Aug. 21, 2017

(65) Prior Publication Data
US 2018/0059709 A1 Mar. 1, 2018

Related U.S. Application Data

(60) Provisional application No. 62/378,750, filed on Aug. 24, 2016.

(51) Int. Cl.
*G05G 1/38* (2008.04)
*B60W 10/02* (2006.01)
(Continued)

(52) U.S. Cl.
CPC .............. *G05G 1/38* (2013.01); *B60W 10/02* (2013.01); *B60W 30/1819* (2013.01);
(Continued)

(58) Field of Classification Search
CPC  G05G 1/38; G05G 1/44; G05G 1/445; G05G 1/30; H01H 3/0213; H01H 21/26
See application file for complete search history.

(56) References Cited

U.S. PATENT DOCUMENTS 5,385,068 A * 1/1995 White ............. G05G 1/30
  74/512
5,416,295 A * 5/1995 White ............. G05G 1/38
  200/61.89

(Continued)

FOREIGN PATENT DOCUMENTS

EP  2874041 B1  5/2017

OTHER PUBLICATIONS

Acceleration Karting, Accelerator/Brake Pedal Position Sensor; http://www.accelerationkarting.com/acceleratorbrakepedalpositionsensor.html.
(Continued)

*Primary Examiner* — Richard W Ridley
*Assistant Examiner* — Brian J McGovern
(74) *Attorney, Agent, or Firm* — Daniel Deneufbourg

(57) ABSTRACT

A vehicle pedal with a contacting sensor that comprises a pedal arm coupled to and rotatable relative to a pedal housing. A rotor includes a first end coupled to the pedal arm and an opposed end with contactors abutting and adapted to slide against a resistive element in response to the rotation of the pedal arm. A head on the rotor includes means for preventing the over-deflection of the contactors. In one embodiment, the means for preventing the over-deflection of the contactors comprises an extension on the head of the rotor that defines a stop limiting the deflection of the contactors. In another embodiment, the means for preventing the over-deflection of the contactors comprises the combination of a tab on the head of the rotor and a wall in the interior of the pedal housing. The tab abuts against the wall and prevents the movement of the rotor in the direction of the resistive element.

4 Claims, 5 Drawing Sheets

(51) Int. Cl.
  *B60W 30/18*   (2012.01)
  *G05G 1/445*   (2008.04)
  *H01C 10/30*   (2006.01)

(52) U.S. Cl.
  CPC ..... *G05G 1/445* (2013.01); *B60W 2510/0225* (2013.01); *B60W 2540/14* (2013.01); *B60W 2710/022* (2013.01); *H01C 10/30* (2013.01)

(56) References Cited

U.S. PATENT DOCUMENTS

| | | | |
|---|---|---|---|
| 6,029,510 | A | 2/2000 | Nakaie et al. |
| 6,089,342 | A | 7/2000 | Mueller et al. |
| 6,330,838 | B1 | 12/2001 | Kalsi |
| 6,571,661 | B1 | 6/2003 | Hemenway et al. |
| 6,592,494 | B2 | 7/2003 | St. Pierre et al. |
| 6,725,741 | B2 | 4/2004 | Menzies |
| 7,134,327 | B2 | 11/2006 | Saito et al. |
| 7,415,909 | B2 | 8/2008 | Miyoshi et al. |
| 8,136,892 | B2 | 1/2012 | Lacroix et al. |
| 8,240,230 | B2 | 8/2012 | Peniston et al. |
| 8,550,412 | B2 | 10/2013 | Slade et al. |
| 8,596,162 | B2 | 12/2013 | Nozu et al. |
| 8,960,049 | B2 | 2/2015 | Murayama et al. |
| 9,360,882 | B2 | 6/2016 | Kaijala et al. |
| 9,442,030 | B2 | 9/2016 | Fujiwara et al. |
| 9,785,183 | B2 * | 10/2017 | Kaijala ............... G05G 1/38 |
| 2010/0077886 | A1 * | 4/2010 | Seiltz ............... G05G 1/38 74/513 |
| 2012/0031221 | A1 | 2/2012 | Campbell |
| 2014/0090512 | A1 | 4/2014 | Kaijala et al. |
| 2014/0311277 | A1 | 10/2014 | Fujiwara |
| 2015/0128755 | A1 * | 5/2015 | Kaijala ............... G05G 1/38 74/514 |

OTHER PUBLICATIONS

Meder Electronic, Brake Pedal Position Sensor, https://standexelectronics.com/wp-content/uploads/Brake_Pedal_Position_Sensor.pdf.

Space Age Control, Engineering Guide for Motorsports, https://www.spaceagecontrol.com/s054k.htm.

* cited by examiner

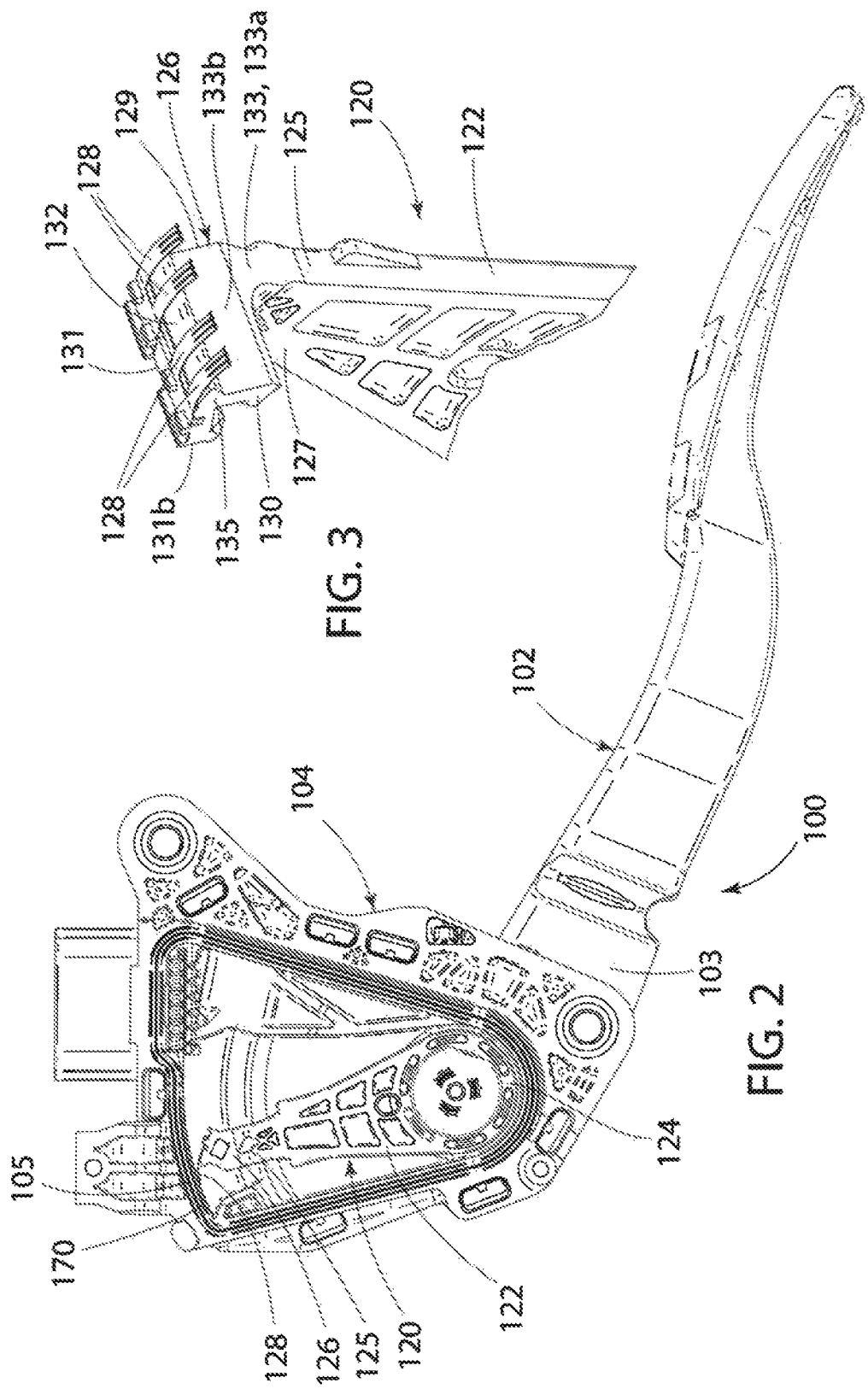

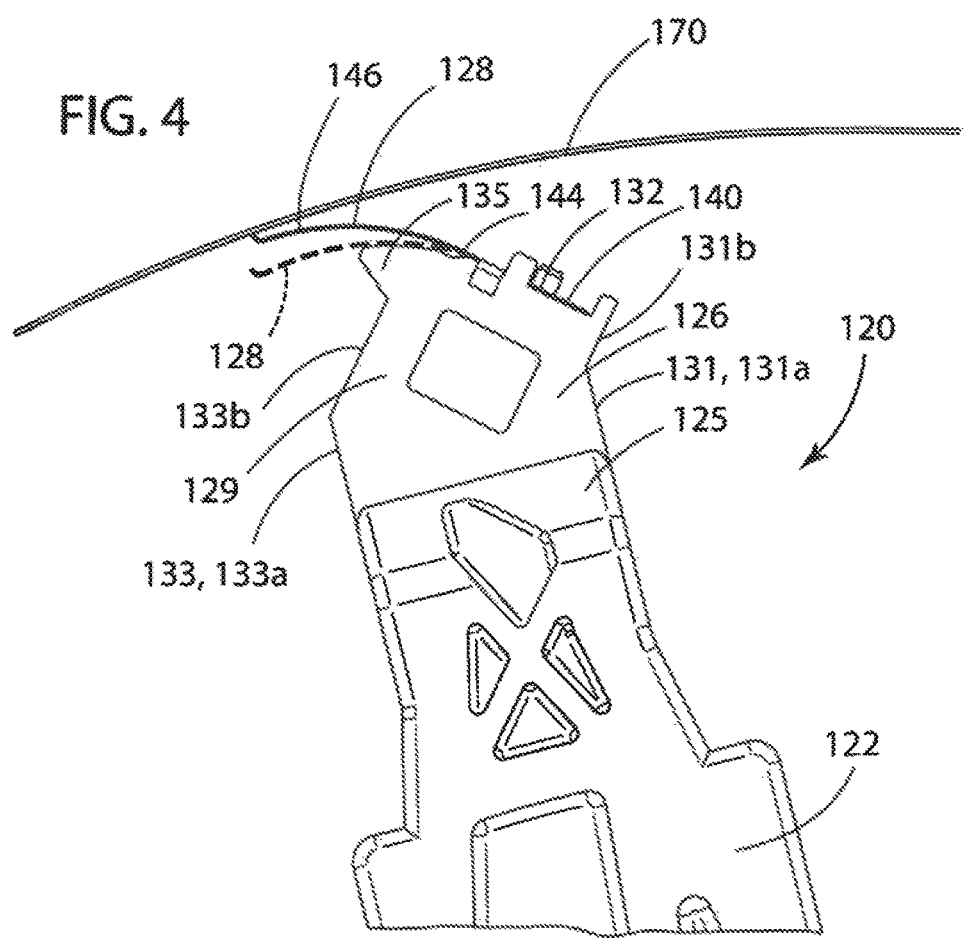

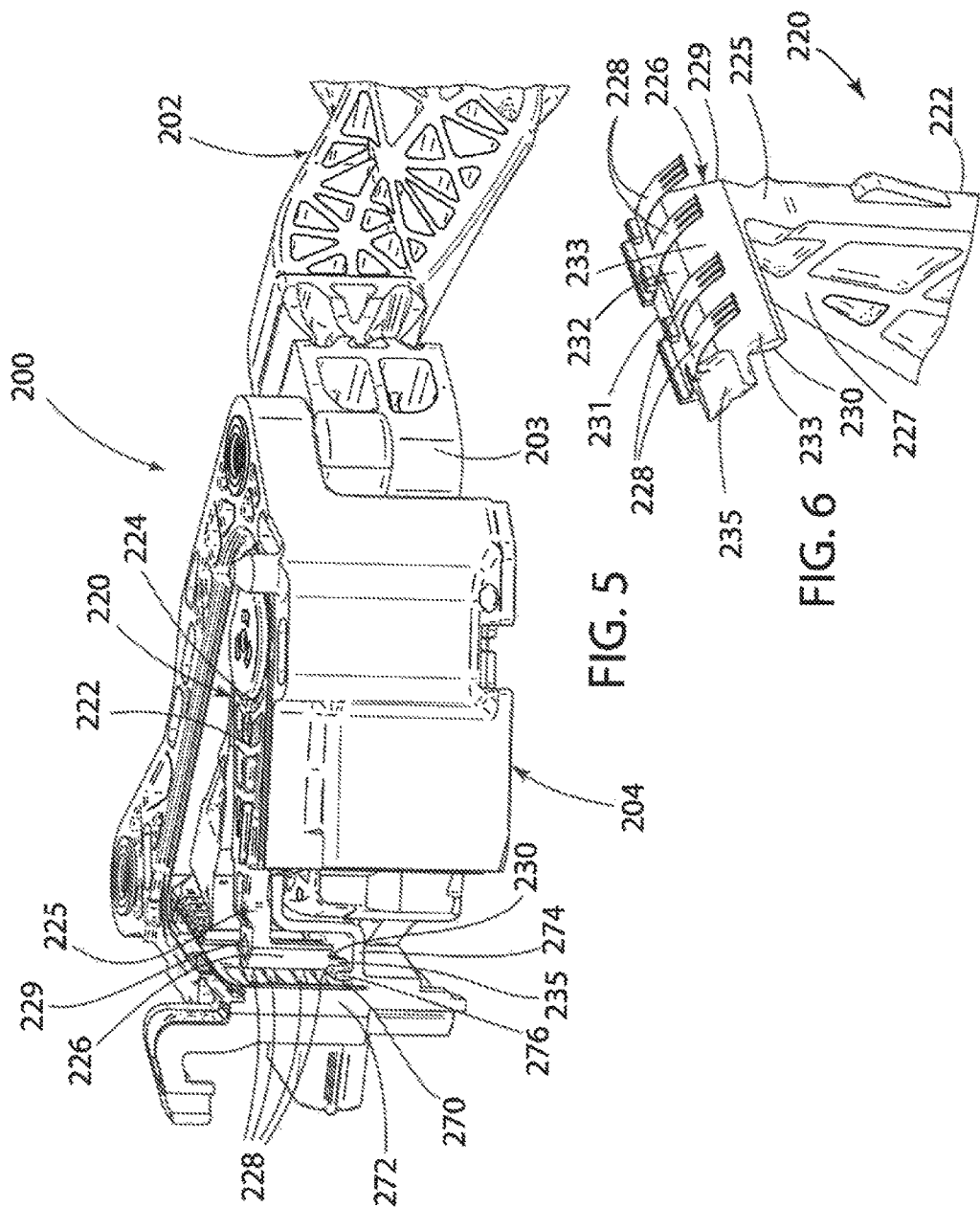

ROTOR FOR VEHICLE PEDAL WITH CONTACTING SENSOR

CROSS-REFERENCE TO RELATED APPLICATION

This patent application claims priority and benefit of the filing date of U.S. Provisional Patent Application Ser. No. 62/378,750 filed on Aug. 24, 2016, the disclosure and contents of which is expressly incorporated herein in its entirety by reference.

FIELD OF THE INVENTION

This invention relates generally to a vehicle pedal and, more specifically, to a rotor for a vehicle pedal with a contacting sensor.

BACKGROUND OF THE INVENTION

Vehicle pedals with a contacting sensor, such as for example, the vehicle pedal disclosed in U.S. Pat. No. 9,360,882 to Kaijala et al, incorporate a potentiometer structure in the form of a rotor that is coupled to a pedal arm and is adapted for rotation in response to rotation of the pedal arm. Metal electrical contactors on a head of the rotor are adapted for contacting and sliding movement against strips of resistive film in response to the rotation of the pedal arm and the rotor to generate an electrical signal that allows the position of the pedal arm to be determined for controlling the acceleration and deceleration of the vehicle.

The present invention is directed to a new rotor structure which prevents the over deflection or bending of the metal contactors on the head of the rotor and loss of contact between the contactors and the resistive film as a result of, for example, a vehicle accident.

SUMMARY OF THE INVENTION

The present invention is generally directed to a vehicle pedal with a contacting sensor comprising a pedal housing, a pedal arm coupled to and rotatable relative to the pedal housing and including a distal drum rotatable relative to the pedal housing, a rotor including a first end coupled to the distal drum of the pedal arm and an opposed end including electrical contactors abutting and sliding against a resistive element in the pedal housing in response to the rotation of the pedal arm and the rotor for generating an electrical signal determinative of the position of the pedal arm, and a head on the rotor with means for preventing the over-deflection of the contactors.

In one embodiment, the means for preventing the over-deflection of the contactors comprises a top exterior contactor support surface on the head having a width greater than about one half the length of the connectors.

In one embodiment, the head includes an upwardly and outwardly angled top exterior contactor support surface.

In one embodiment, the means for preventing the over-deflection of the contactors comprises an extension on the head of the rotor that defines a stop limiting the deflection of the contactors.

In one embodiment, the means for preventing the over-deflection of the contactors comprises the combination of a tab on the head of the rotor and a wall in the interior of the pedal housing, the tab abutting against the wall and preventing the movement of the rotor in the direction of the resistive element.

The present invention is also directed to a rotor for a vehicle pedal with a contacting sensor, the rotor including a head with contactors, the head including means for preventing the over-deflection of the contactors.

In one embodiment, the means for preventing the over-deflection of the contactors comprises an extension on the head of the rotor defining a stop for the contactors.

In one embodiment, the means for preventing the over-deflection of the contactors comprises a tab on the head of the rotor and a wall in a housing for the vehicle pedal, the tab on the head of the rotor abutting against the wall and limiting the movement of the rotor.

In one embodiment, the means for preventing the over-deflection of the contactors comprises a bumper on the head of the rotor adapted for contact with a back wall of the housing in response to a forward movement of the rotor in the direction of the resistive element in the pedal housing.

In one embodiment, the means for preventing the over-deflection of the contactors comprises a bumper on the head of the rotor adapted for contact with a back wall in a housing of a vehicle pedal in response to a forward movement of the rotor in the direction of the back wall of the housing of the vehicle pedal.

The present invention is further directed to a vehicle pedal with a contacting sensor comprising a housing, a pedal arm extending into the housing, a rotor in the housing, the rotor extending from the pedal arm and including a head having contactors in contact with a resistive film in the housing, and an extension on the head of the rotor that defines a seat and a stop for the contactors that prevents the over-deflection of the contactors.

In one embodiment, the head with the extension has a width greater than about one half the length of the connectors.

In one embodiment, the head with the extension has a width of about three quarters the length of the connectors.

In one embodiment, the extension defines a stop and seat for the contactors.

In one embodiment, the extension limits the deflection to less than about ten degrees.

Other advantages and features of the present invention will be more readily apparent from the following detailed description of the preferred embodiments of the invention, the accompanying drawings, and the appended claims.

BRIEF DESCRIPTION OF THE DRAWINGS

These and other features of the invention can best be understood by the description of the accompanying FIGURES as follows:

FIG. 2 is a side elevational view of a vehicle pedal incorporating a rotor in accordance with the present invention;

FIG. 3 is an enlarged broken perspective view of he rotor of the present invention;

FIG. 4 is an enlarged, simplified, side elevational view of the rotor of the present invention depicting the deflection of the metal contactors on the rotor of the present invention;

FIG. 5 is an enlarged broken side perspective view of a vehicle pedal incorporating an additional rotor embodiment of the present invention;

FIG. 6 is an enlarged broken perspective view of the additional embodiment of the rotor in accordance with the present invention;

DETAILED DESCRIPTION OF THE EMBODIMENT

Figure 1:
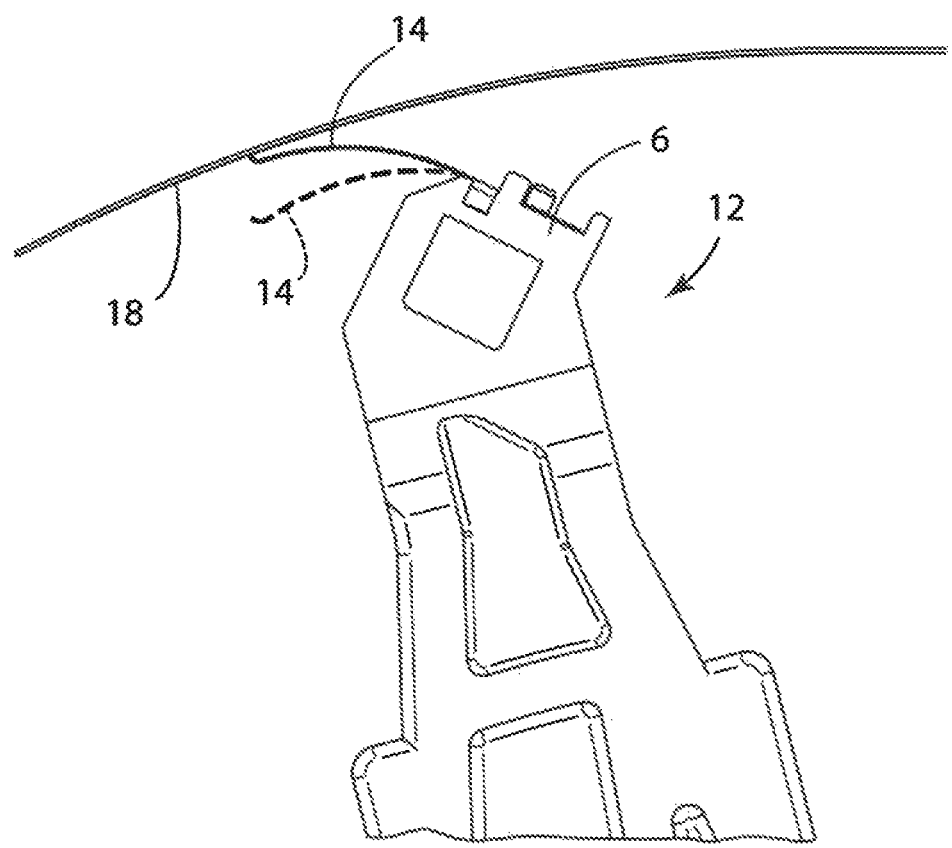
FIG. 1 is an enlarged broken simplified side elevational view depicting the over deflection of the metal contactors on a prior art rotor.

FIG. 1 depicts the rotor 12 of a vehicle pedal with contacting position sensor of the type disclosed in for example U.S. Pat. No. 9,360,882 to Kaijala et al in which contactors 14 on the distal head 6 of the rotor 12 are adapted to slide against strips of resistive film 18 in response to the rotation of the rotor 12 for generating electrical signals indicative of the position of the rotor 12 and thus the position of the pedal arm.

In use, the contactors 14 on the head 6 of the rotor 12 can be over deflected or bent in response to, for example, a vehicle accident resulting in a undesirable loss of contact between the contactors 14 and the strips of resistive film 18 as shown in phantom in FIG. 1.

FIG. 2 depicts a vehicle accelerator pedal 100 incorporating a rotor 120 in accordance with the present invention that incorporates means or structure for preventing the over deflection of metal contactors 128 on the head 126 of the rotor 120 as discussed in more detail below.

Referring to FIG. 2, the vehicle accelerator pedal 100 comprises an elongated pedal arm 102 including a distal end or drum 103 extending into the interior of, and rotatable relative to, a pedal housing 104. The rotor 120 includes an elongated arm 122, a first proximal end 124 coupled to the drum 103 of the pedal arm 102 and a generally L-shaped distal end 125 including a head 126. A plurality of metal contactors 128 are coupled to and extend from a top surface of the head 126 of the rotor 120.

The rotor 120 is rotatable in response to the rotation of the pedal arm 102 and the drum 103 and the metal contactors 128 are adapted for contacting and sliding movement against the surface of respective strips of resistive film 170 which are seated against the interior surface of a back wall 105 of the pedal housing 104 in response to the rotation of the rotor 120 for generating an electrical signal that allows the position of the pedal arm 102 to be determined thus allowing for the control of the acceleration and deceleration of a vehicle.

Referring to FIGS. 3 and 4, the head 126 of the rotor 120 extends upwardly and outwardly from the distal end 125 of the rotor 120 and, more specifically, generally normally unitarily outwardly from one of the side faces 127 of the distal end 125 of the arm 122 of the rotor 120 so as to form a head 126 in the form, shape, and configuration of the head of a golf club.

The head 126 includes a first exterior side surface or face 129 co-planar with the exterior side face of the rotor 120 and an opposed second exterior side surface or face 130 spaced from and generally parallel to the first exterior side surface 129 and spaced from and generally parallel to the other of the exterior side faces 127 of the rotor 126.

The head 126 further includes a back exterior surface or face 131 extending between the back edges of the first and second exterior side surfaces or faces 129 and 130 in a direction transverse to the direction of the first and second exterior side surfaces or faces 129 and 131 and including a first segment 131a and a second segment 131b extending upwardly and outwardly from the end of the first segment 131a at an angle relative to the first segment 131a.

The head 126 still further includes a front exterior surface or face 133 extending between the front edges of the first and second exterior side surfaces or faces 129 and 130 in the same direction as the back face 131 and in a direction transverse to the direction of the first and second exterior side surfaces or faces 129 and 130 and including a first segment 133a extending in a relationship spaced and parallel to the first segment 131a of the back surface 131 and a second segment 133b extending upwardly and inwardly from the end of the first segment 133a at an angle relative to the first segment 133a and in a relationship spaced from and parallel to the second segment 131b of the back surface 131.

The head 126 still additionally includes a top exterior surface or face 132 extending between the top edges of the first and second exterior side surfaces 129 and 130 and the respective top edges of the respective angled segments 133b and 131b of the front and back exterior side surfaces 133 and 131 in the same direction as the front and back exterior surfaces or faces 133 and 131 and in a direction transverse to the direction of the first and second exterior surfaces or faces 129 and 131.

Still referring to FIGS. 3 and 4, the top exterior surface or face 132 of the head 126, extends and slopes upwardly and outwardly away from the upper edge of the second segment 131b of the back exterior surface or face 131 of the head 126 at an angle of approximately twenty five degrees (25°) and terminates in the upper edge of the second segment 133b of the front exterior surface or face 133 of the head 126.

The head 126 further includes a front elongate extension or projection or lip 135 that protrudes outwardly from the top longitudinal edge of the segment 133b of the front exterior surface 133 of the head 126 and which includes a top exterior surface extending from and unitary with the top exterior surface 132 of the head 126.

In the embodiment shown, the top exterior surface of the front lip 135 curves and slopes outwardly and slightly downwardly away from the top exterior surface 133 of the head 126.

Still referring to FIGS. 3 and 4, each of the respective metal flexible contactors 128 includes a first end 140 coupled to the back edge of the top exterior surface 132 of the head 126, a body 144 extending the full width of the top exterior surface 132 and the front lip 135 of the head 126, and a distal free contactor end or tip 146 unitary with the body 144 and extending a distance past and beyond the front lip 135 of the head 126 and in contact with the respective resistive elements or film 170.

Still more specifically, in the embodiment as shown in FIGS. 3 and 4, the width of the top exterior surface or face 132 is equal to at least one half (½) the length of the contactors 128 and still more specifically equal to approximately three quarters (¾) the length of the contactors 128.

In accordance with the present invention, the head 126, and more specifically the top exterior surface or face 132 and the front lip 135, is angled relative to the distal end 125 of the rotor 120 to prevent the over-deflection or bending of the contactors 128. The head 126, and more specifically the top exterior surface or face 132 and the front lip 135, are positioned at an angle relative to the distal end 125 of the rotor 120 and define and act as a stop or seat for the contactors 128 that limits the deflection or bending of the contactors 128 in response to movement of the rotor 120 in the direction of the film 170 to no more than about approximately ten degrees (10°) as shown in phantom in FIG. 4 relative to the normal position of the contactors 128 as also shown in FIG. 4 with the contactors 128 in sliding contact against the film 170.

Stated another way, the size, configuration, placement, and angle of the top exterior surface or face 132 and front lip 135 relative to the distal end 125 of the rotor 12 is such as to prevent the radius of curvature of the metal contactors 128 from becoming small enough in the event of an over-deflection of the metal contactors 128 to cause permanent deformation (yielding) of the metal contactors 128 away from the surface of the resistive film 170 thereby assuring continuous electrical contact with the resistive elements or film 170 and thus continuous connection with the circuit of the contacting sensor.

FIG. 5 depicts a pedal 200 incorporating an additional rotor embodiment 220 in accordance with the present invention.

The vehicle accelerator pedal 200 comprises an elongated pedal arm 202 including a distal end or drum 203 extending into the interior of, and rotatable relative to, a pedal housing 204. The rotor 220 includes an elongated arm 222, a first proximal end 224 coupled to the drum 203 of the pedal arm 202 and a distal end 225 including a head 226. A plurality of metal contactors 228 are coupled to and extend from a top surface 232 of the head 226 of the rotor 220.

The rotor 220 is rotatable in response to the rotation of the drum 203 of the pedal arm 202 and the metal contactors 228 are adapted for contacting and sliding movement against the surface of respective strips of resistive film 270 abutting against and extending along a back wall 272 of the pedal housing 204 in response to the rotation of the rotor 220 for generating an electrical signal adapted to allow the position of the pedal arm to be determined thus allowing for the control of the acceleration and deceleration of a vehicle.

In the embodiment of FIG. 5, the pedal housing 204 additionally includes an interior partition wall 274 that includes an elongate projection or rib 276 projecting outwardly therefrom in a direction normal to the interior partition wall 274 and further in a relationship spaced and parallel to the back housing wall 272 and the film 270 seated on the back housing wall 272.

Referring to FIGS. 5 and 6, the rotor 220 includes a head 226 that extends generally normally unitarily outwardly from one of the side faces 227 of the distal end 225 of the arm 222 of the rotor 220 so as to form a head 226 in the form, shape, and configuration of the head of a golf club.

The head 226 includes a first exterior side surface or face 229 generally co-planar with an exterior side face of the rotor 220; an opposed second exterior side surface or face 230 spaced from and generally parallel to the first exterior side surface 229 and the other of the side faces 227 of the rotor 220; a back exterior surface or face 231 extending between the back edges of the first and second exterior side surfaces or faces 229 and 230 in a direction transverse to the direction of the first and second exterior side surfaces or faces 229 and 231; a front angled exterior surface or face 233 extending between the front edges of the first and second exterior side surfaces or faces 229 and 230 in the same direction as the back face 231 and in a direction transverse to the direction of the first and second exterior side surfaces or faces 229 and 230; and a top exterior surface or face 232 extending between the top edges of the first and second exterior side surfaces 229 and 230 and the respective top edges of the front and back exterior side surfaces 233 and 231 in the same direction as the front and back exterior surfaces or faces 233 and 231 and in a direction transverse to the direction of the first and second exterior surfaces or faces 229 and 231.

The head 226 further comprises a side extension or projection or lip or tab 235 that protrudes outwardly from the exterior of the side surface or face 230 of the head 226 and includes a top exterior surface extending and unitary with the top exterior surface 232 of the head 226.

In accordance with the invention as shown in FIGS. 5 and 6, the rotor 220 is located and positioned in the interior of the pedal housing 204 in a relationship with the head 226 positioned opposite and spaced from and parallel to the back wall 272 of the pedal housing 204 with the contactors 228 thereof in contact with the film 270 on the back wall 272 of the pedal housing 204 and the lip 234 on the head 226 positioned and abutted against the elongate rib 276 projecting outwardly from the interior partition wall 274 of the pedal housing 204.

Still further in accordance with the present invention, the lip 234 prevents the forward movement of the rotor 220 and the head 226 thereof in the direction of the back wall 272 in the event of, for example, a vehicle accident thereby preventing the over deflection of the contactors 228 and thus assuring no loss of contact between the contactors 228 and the film 270 during operation of the pedal 200.

Figure 8:
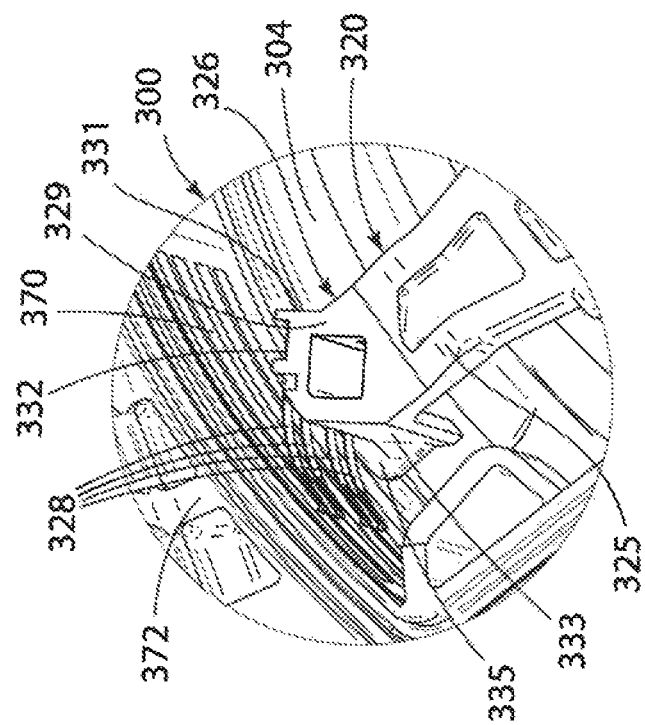
FIG. 8 is an enlarged broken side perspective view of a vehicle pedal incorporation the further rotor embodiment shown in FIG. 7.
Figure 7:
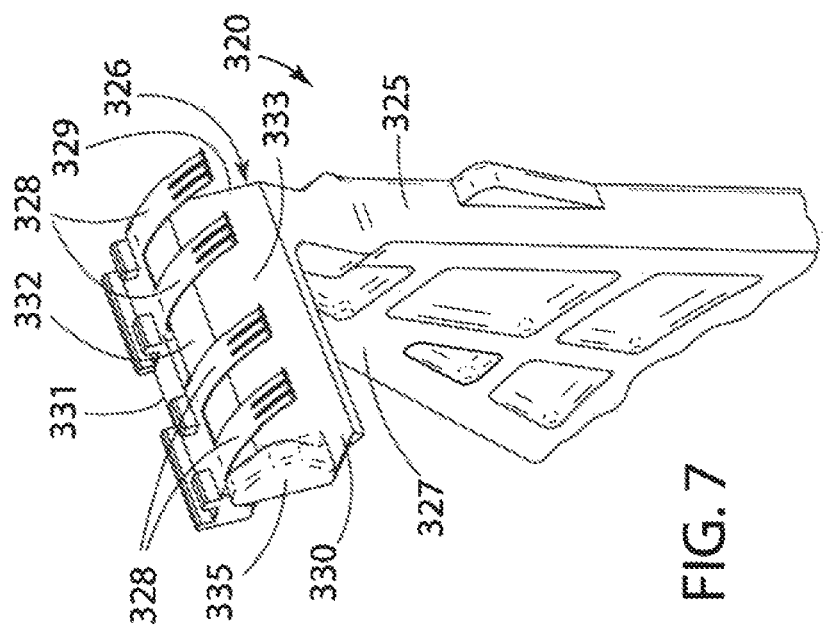
FIG. 7 is an enlarged broken perspective view of a further embodiment of a rotor in accordance with the present invention.

FIGS. 7 and 8 depict yet an additional rotor embodiment 320 which, like the earlier rotor embodiments 120 and 220 also includes a head 326 extending generally normally unitarily outwardly from one of the side faces 327 of the distal end 325 of the arm 322 of the rotor 320 so as to form a head 326 in the form, shape, and configuration of the head of a golf club.

The head 326 includes a first exterior side surface or face 329 generally co-planar with an exterior side face of the rotor 320; an opposed second exterior side surface or face 330 spaced from and generally parallel to the first exterior side surface 329 and the other of the side faces 327 of the rotor 320; a back exterior surface or face 331 extending between the back edges of the first and second exterior side surfaces or faces 329 and 330 in a direction transverse to the direction of the first and second exterior side surfaces or faces 329 and 330; a front angled exterior surface or face 333 extending between the front edges of the first and second exterior side surfaces or faces 329 and 330 in the same direction and angle as the back face 331 and in a direction transverse to the direction of the first and second exterior side surfaces or faces 329 and 330; and a top exterior surface or face 332 extending between the top edges of the first and second exterior side surfaces 329 and 330 and the respective top edges of the front and back exterior side surfaces 333 and 331 in the same direction as the front and back exterior surfaces or faces 333 and 331 and in a direction transverse to the direction of the first and second exterior surfaces or faces 329 and 331.

The head 326 further comprises an extension or projection or tab or bumper 335 that protrudes and extends unitarily outwardly, upwardly, and forwardly from the exterior side face 330 of the head 326 of the rotor 320.

More specifically, the bumper 335 includes a first portion that protrudes unitarily outwardly in the Z direction from the exterior side face 330 of the head 326; a second section that protrudes unitarily outwardly and upwardly in the y direction from the edge of the exterior top surface 332 of the head 326 in contact with the top edge of the exterior side face 330 of the head 326; and a third section that protrudes outwardly and forwardly in the x direction from the edge of front exterior face 333 of the head 326 in contact with the front edge of the exterior side face 330 of the head 326.

In accordance with the invention as shown in FIGS. 7 and 8, the rotor 320 is adapted to be positioned in the interior of the pedal housing 304 in a relationship with the head 326 and the bumper 335 positioned opposite and spaced from and parallel to the back wall 372 of the pedal housing 304 and the resistive film 330 on the back wall 372.

Still further, in accordance with the present invention, and in event of for example a vehicle accident that results in the movement of the head 326 of the rotor 320 in the direction of the back wall 372 of the pedal housing 304, the bumper 338 will come into the contact with the back wall 372 of the pedal housing 304 thus limiting or arresting or stopping the further movement of the head 326 towards the back wall 375 thus preventing the over deflection of the contactors 328 and thus assuring that there is no loss of contact between the contactors 328 and the resistive film 370 on the back wall 372 of the pedal housing 304.

Numerous variations and modifications of the embodiments described above may be effected without departing from the spirit and scope of the novel features of the invention. It is to be understood that no limitations with respect to the pedal and rotor illustrated herein are intended or should be inferred. It is, of course, intended to cover by the appended claims all such modifications as fall within the scope of the claims.

What is claimed is:

1. A vehicle pedal with a contacting sensor comprising:
   a pedal housing;
   a pedal arm coupled to and rotatable relative to the pedal housing and including a distal drum rotatable relative to the pedal housing;
   a rotor including a first end coupled to the distal drum of the pedal arm and an opposed end including electrical contactors abutting and sliding against a resistive element in the pedal housing in response to a rotation of the pedal arm and the rotor for generating an electrical signal determinative of a position of the pedal arm; and
   a head on the opposed end including an upwardly and outwardly extending top exterior surface;
   a lip projecting outwardly from the top exterior surface of the head, the lip and head in combination having a width greater than at least one half a respective length of each of the electrical contactors such that the lip prevents a respective over-deflection of each of the electrical contactors by acting as a seat for the electrical contactors.

2. A rotor for a vehicle pedal with a contacting sensor, the rotor including a head with contactors, the head including an upwardly and outwardly extending top exterior surface;
   a lip projecting outwardly from the top exterior surface of the head, the lip and head in combination having a width greater than at least one half a respective length of each of the contactors such that the lip prevents a respective over-deflection of each of the contactors by acting as a seat for the contactors.

3. The vehicle pedal of claim 1, wherein the width of the combination of the lip and head is approximately three quarters the respective length of each of the electrical contactors.

4. The vehicle pedal of claim 1, wherein the lip limits a respective deflection of each of the electrical contactors to less than about ten degrees.

* * * * *